US009622047B1

(12) United States Patent
Gu et al.

(10) Patent No.: US 9,622,047 B1
(45) Date of Patent: *Apr. 11, 2017

(54) WIFI-FINGERPRINT BASED INDOOR LOCALIZATION MAP

(71) Applicant: International Business Machines Corporation, Armonk, NY (US)

(72) Inventors: Yu Gu, Cedar Park, TX (US); Inseok Hwang, Austin, TX (US); Su Liu, Austin, TX (US); Yaoguang Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/264,801

(22) Filed: Sep. 14, 2016

Related U.S. Application Data

(63) Continuation of application No. 15/083,406, filed on Mar. 29, 2016, now Pat. No. 9,473,903, which is a
(Continued)

(51) Int. Cl.
*H04W 4/04* (2009.01)
*H04B 17/318* (2015.01)
(Continued)

(52) U.S. Cl.
CPC .......... *H04W 4/043* (2013.01); *H04B 17/318* (2015.01); *H04L 5/006* (2013.01); *H04W 84/12* (2013.01)

(58) Field of Classification Search
CPC ....... H04W 4/02; H04W 4/023; H04W 64/00; H04W 4/021; H04W 4/008; H04W 4/025;
(Continued)

(56) References Cited

U.S. PATENT DOCUMENTS 7,532,113 B2   5/2009   Horvitz et al.
7,881,720 B2   2/2011   Huang et al.
(Continued)

FOREIGN PATENT DOCUMENTS

CN    103582119 A   2/2014
CN    103796163 A   5/2014
WO    2014189495 A1  11/2014

OTHER PUBLICATIONS

Rai et al., "Zee: Zero-Effort Crowdsourcing for Indoor Localization," MobiCom '12, Aug. 22-26, 2012, Istanbul, Turkey, ACM New York, NY, USA © 2012, pp. 1-12.
(Continued)

*Primary Examiner* — Vladimir Magloire
*Assistant Examiner* — Donald H Braswell
(74) *Attorney, Agent, or Firm* — Samuel A. Waldbaum

(57) ABSTRACT

Embodiments of the present disclosure relate to making a localization map for a network. A fixed location for a plurality of wireless devices is received and a bisecting line is determined in a plane for each straight line that joins a pair of the plurality of wireless devices. An initial wireless device access sequence is assigned to each of a plurality of regions created on the localization map by the bisecting lines based on the Euclidean distance of the wireless device to the each of the plurality of regions, wherein the wireless device access sequence is the sequence of the wireless devices that provide the strongest to weakest signal to the region. Receiving from a user computing device a received signal strength (RSS) value for each signal received by the user computing device from each of the plurality of wireless devices and updating the localization map based on RSS values.

1 Claim, 11 Drawing Sheets

Related U.S. Application Data continuation of application No. 14/934,324, filed on Nov. 6, 2015.

(51) Int. Cl.
*H04W 84/12* (2009.01)
*H04L 5/00* (2006.01)

(58) Field of Classification Search
CPC ... H04W 40/244; H04W 4/04; H04W 64/003; H04W 88/08; G01S 5/0252; G01S 5/02; G01S 5/021; G01S 5/0289; G01S 5/0273; G01S 5/10; G01S 5/00; G01S 5/0036; G01S 5/0221; G01S 5/0226; G01S 5/0257; G01S 5/0278; G01S 5/12
USPC .......................................... 455/456.1–456.6
See application file for complete search history.

(56) References Cited

U.S. PATENT DOCUMENTS

| | | | |
|---|---|---|---|
| 8,583,400 B2 | 11/2013 | Thrun et al. | |
| 8,639,640 B1 | 1/2014 | Kadous | |
| 8,862,400 B2 | 10/2014 | Kelly | |
| 8,880,105 B2 | 11/2014 | Aweya et al. | |
| 8,933,841 B2 | 1/2015 | Valaee et al. | |
| 9,055,450 B2 | 6/2015 | Hand et al. | |
| 9,167,386 B2 | 10/2015 | Valaee et al. | |
| 9,226,111 B2 | 12/2015 | Marti et al. | |
| 9,301,100 B1 | 3/2016 | Jampani et al. | |
| 9,310,462 B2 | 4/2016 | Chintalapudi et al. | |
| 9,357,346 B2 | 5/2016 | Jagannath | |
| 9,408,040 B2 | 8/2016 | Cooper et al. | |
| 9,414,193 B2 | 8/2016 | Li et al. | |
| 9,432,813 B2 | 8/2016 | Ahn et al. | |
| 9,473,903 B1 | 10/2016 | Gu et al. | |
| 2012/0315918 A1 | 12/2012 | Kadous | |
| 2013/0023278 A1 | 1/2013 | Chin | |
| 2014/0011518 A1 | 1/2014 | Valaee et al. | |
| 2015/0156611 A1* | 6/2015 | Aggarwal | H04W 4/04 455/456.1 |
| 2015/0264519 A1 | 9/2015 | Mirzaei et al. | |
| 2015/0281908 A1 | 10/2015 | Venkatraman et al. | |
| 2015/0373503 A1 | 12/2015 | Jovicic | |
| 2016/0037300 A1* | 2/2016 | Vitek | H04W 4/023 455/456.3 |

OTHER PUBLICATIONS

Yang et al., "FreeLoc: Calibration-Free Crowdsourced Indoor Localization," INFOCOM, 2013, Proceedings of the IEEE, Apr. 14-19, 2013, Turin, Italy, pp. 2481-2489.

Youssef et al., "The Horus WLAN Location Determination System," MobiSys '05, Proceedings of the 3rd International Conference on Mobile Systems, Applications, and Services, 2005, ACM New York, NY, USA © 2005, pp. 205-218.

Bahl et al., "RADAR: An In-Building RF-based User Location and Tracking System," INFOCOMM '00, 2000, © 2000, IEEE, pp. 1-10.

Schmitz et al, "The Effect of the Radio Wave Propagation Model in Mobile Ad Hoc Networks," MSWiM '06, Proceedings of the 9th ACM International Symposium on Modeling Analysis and Simulation of Wireless and Mobile Systems, ACM New York, NY, USA © 2006, pp. 61-67.

Berg et al., "Computational Geometry, Algorithms and Applications," Introduction (Chapter 1), Third Edition (Mar. 2008), Published by Springer-Verlag, 3rd rev. ed. 2008, ISBN: 978-3-540-77973-5, http://www.cs.uu.nl/geobook/, pp. 1-17.

IBM: List of IBM Patents or Patent Applications Treated as Related (Appendix P), Oct. 18, 2016, pp. 1-2.

Pending U.S. Appl. No. 15/264,793, filed Sep. 14, 2016, entitled: "WiFi-Fingerprint Based Indoor Localization Map", pp. 1-33.

U.S. Appl. No. 14/934,324, filed Nov. 6, 2015, entitled: "WiFi-Fingerprint Based Indoor Localization Map", pp. 1-39.

* cited by examiner

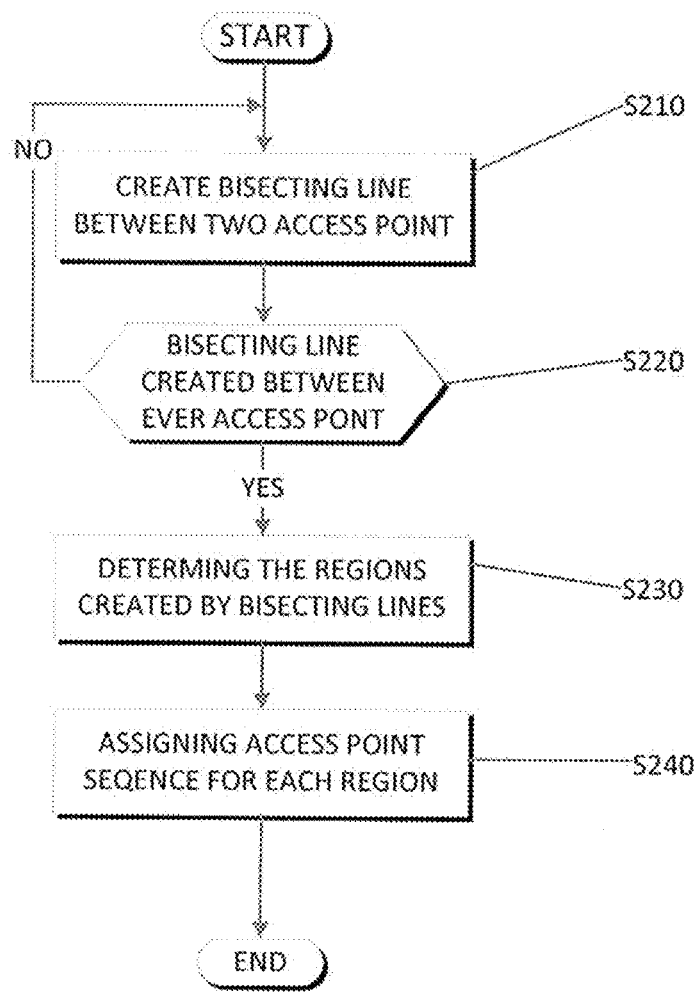

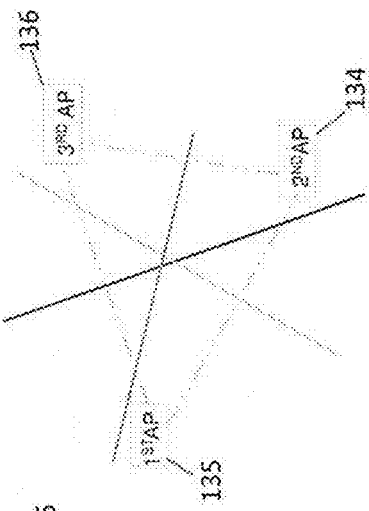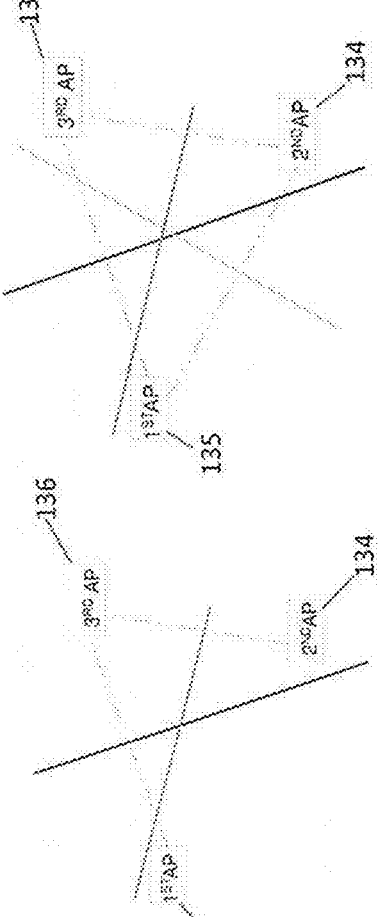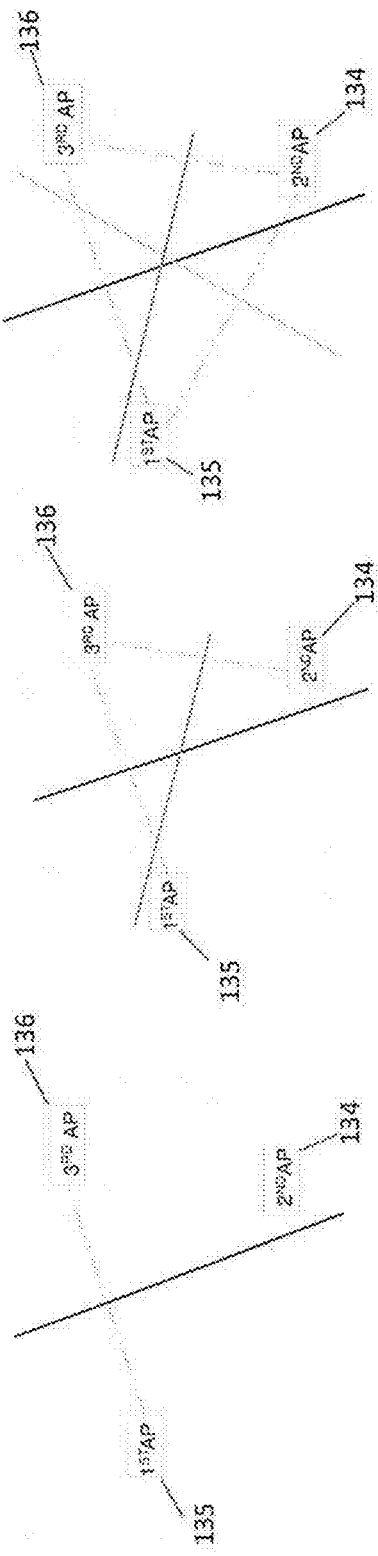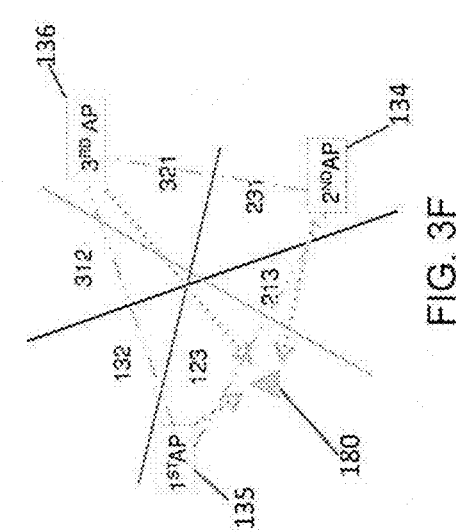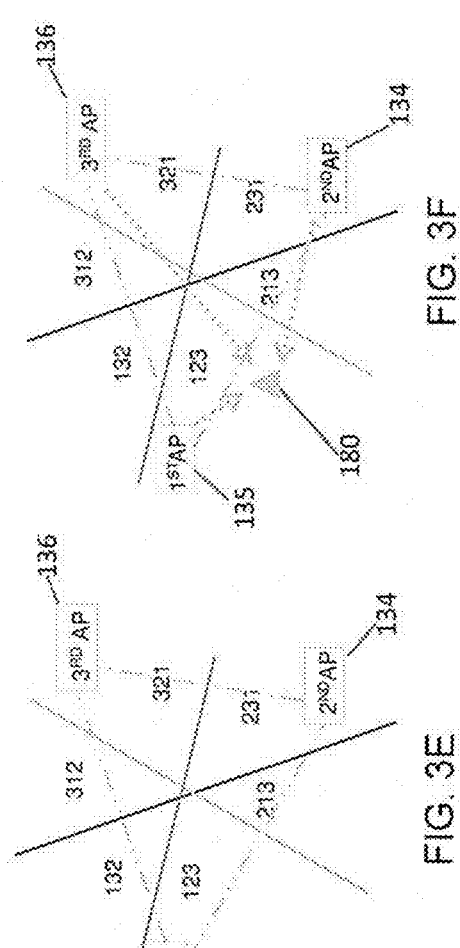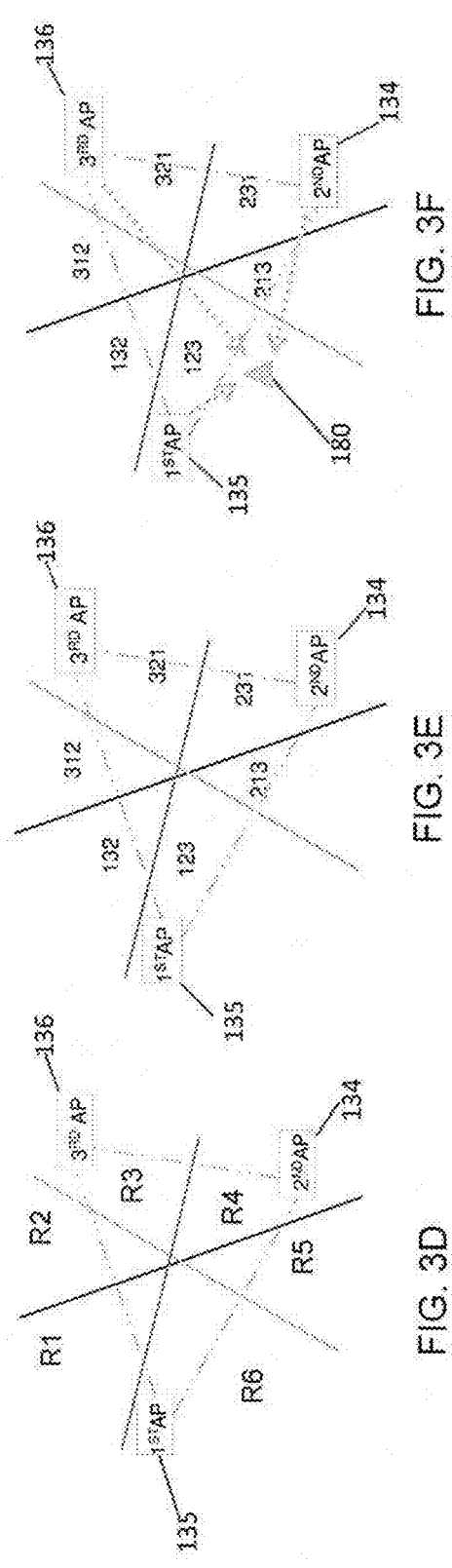

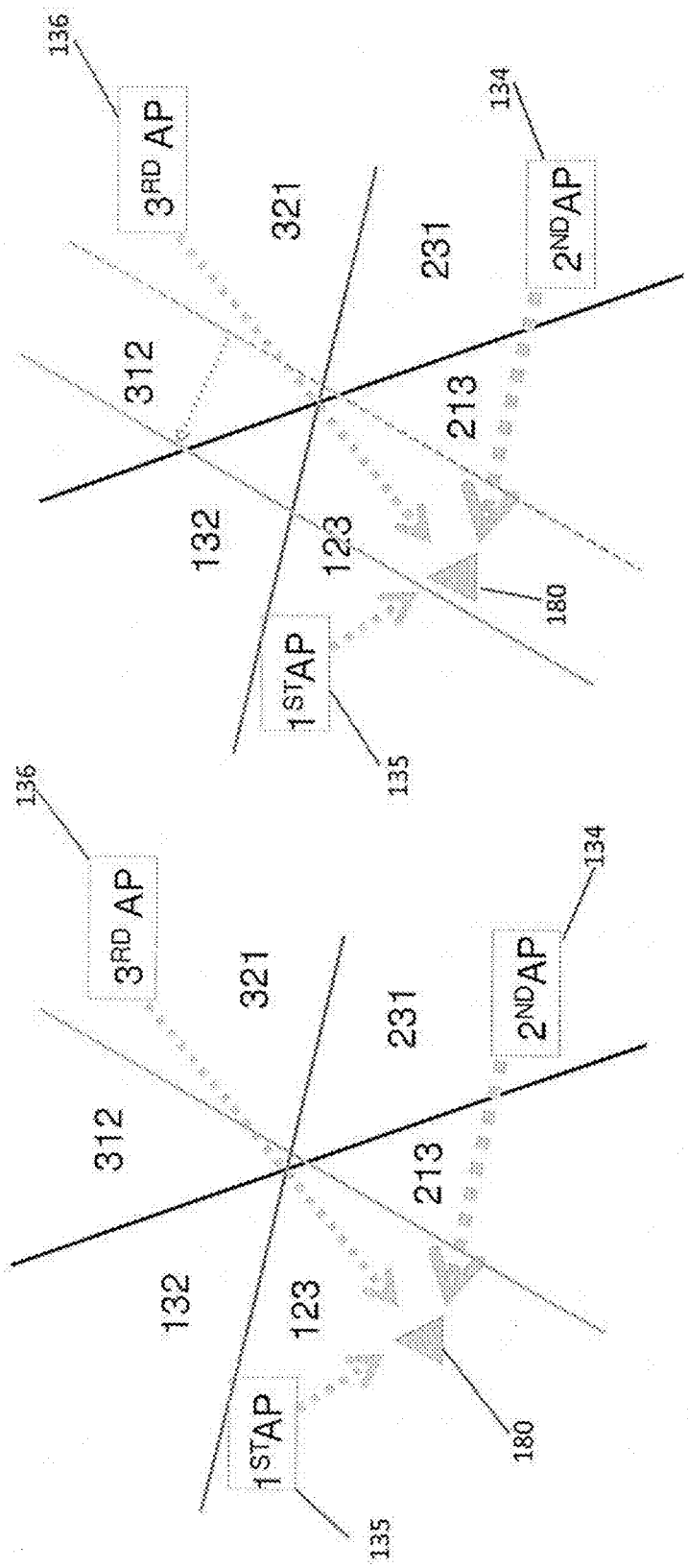

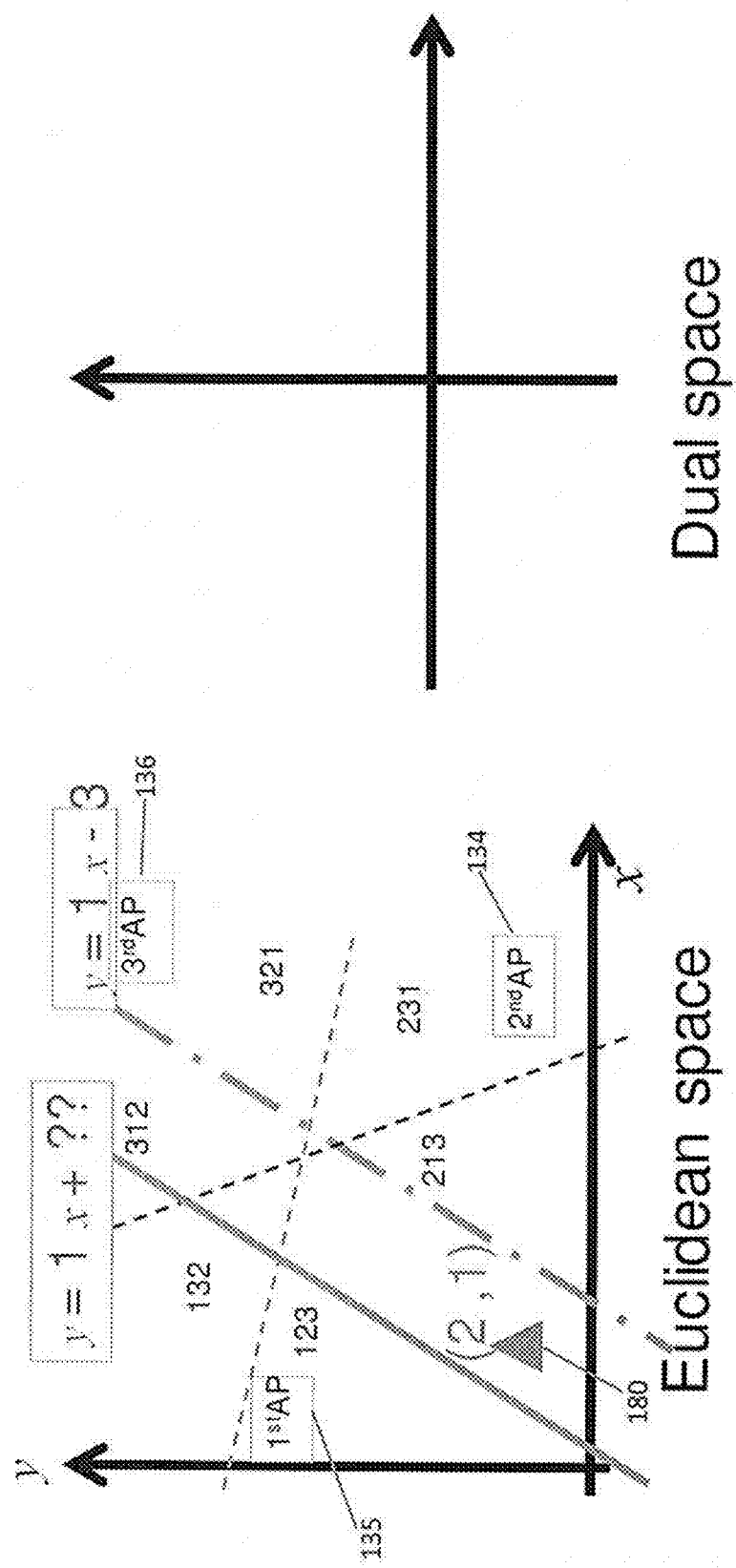

WIFI-FINGERPRINT BASED INDOOR LOCALIZATION MAP

BACKGROUND

The present invention relates generally to the ability to determine the physical location of device within a network, and more particularly to a creation of fingerprint localization map for a WiFi-network to allow for localization of user receiving a signal from the WiFi network.

A number of fingerprint-based localization techniques have been developed for indoor localization. For example, some of these techniques utilize the existing infrastructures such as WiFi, WiMAX, FM, RFID, and Cellular to build the fingerprints. Some others take advantage of the naturally existing ambient signals such as acoustic spectrum, ambient light, and magnetic field.

WiFi-fingerprint-based localization has attracted attention because of the ubiquitous deployment of WiFi access points. However, heavy initial training, handling of temporal fluctuation of received signal strength (RSS), and device heterogeneity still hinder its wide acceptance as a practical solution to the indoor localization. The heavy initial training is a significant bottleneck of fingerprint localization. It is basically the high labor cost of the fingerprint map establishing process.

Another technical challenge is the temporal fluctuation of RSS. This is mostly due to channel noise, change of environment, and dynamic power controlling of WLANs. A large number of RSS scans from a plurality of reference points may be needed to alleviate this issue.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for making a localization map for a network. A computer receives a planer map of an indoor area of interest and a fixed location on a plane for each of a plurality of wireless devices. The computer creates a plurality groups, wherein each group includes two wireless devices of the plurality of wireless devices, wherein each wireless device forms a plurality of groups such that it is forms a group with each of the plurality of wireless devices. The computer determines a straight connecting line that joins a pair of the plurality of wireless devices that form each group, wherein a straight connecting line is determined for each of the plurality of groups and determines a bisecting line for each of the straight connecting lines, such that the bisecting line is a line in the plane that bisects the straight connecting line at an initial predetermined angle between the wireless devices that form the group. The computer assigns an wireless device access sequence to each of a plurality of regions created on the localization map by the bisecting lines, based on the Euclidean distance of the wireless device to the each of the plurality of regions, wherein the wireless device access sequence is the sequence of the wireless devices that provide the strongest to weakest signal to the region. The computer receives from a user computing device at a known location, a received signal strength (RSS) value for each signal received by the user computing device from each of the plurality of wireless devices and determines a RSS access sequence for the known location of the user computing device based on the RSS value. The computer determines that at least two of the plurality of the bisecting lines that are needing adjustment so that the wireless device access sequence for the region where user computing device at the known location would be the same as the RSS access sequence. The computer transforms the localization map into a dual space map to determine an adjustment for the at least two of the plurality of bisecting lines based on the RSS values and updates the localization map based on RSS values.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 2 is a flowchart depicting operational steps creating an initial WiFi-fingerprint localization map, in accordance with an embodiment of the present invention.

FIGS. 3A to 3F illustrates an exemplary process of creating an initial WiFi-fingerprint localization map, in accordance with embodiments of the present invention.

FIGS. 5A and 5B illustrates adjusting a bisecting line of the WiFi-fingerprint localization map, in accordance with embodiments of the present invention.

FIGS. 6A to 6E illustrates an exemplary process transforming the initial WiFi-fingerprint localization map from Euclidean space to dual space, in accordance with embodiments of the present invention.

DETAILED DESCRIPTION

Figure 1:
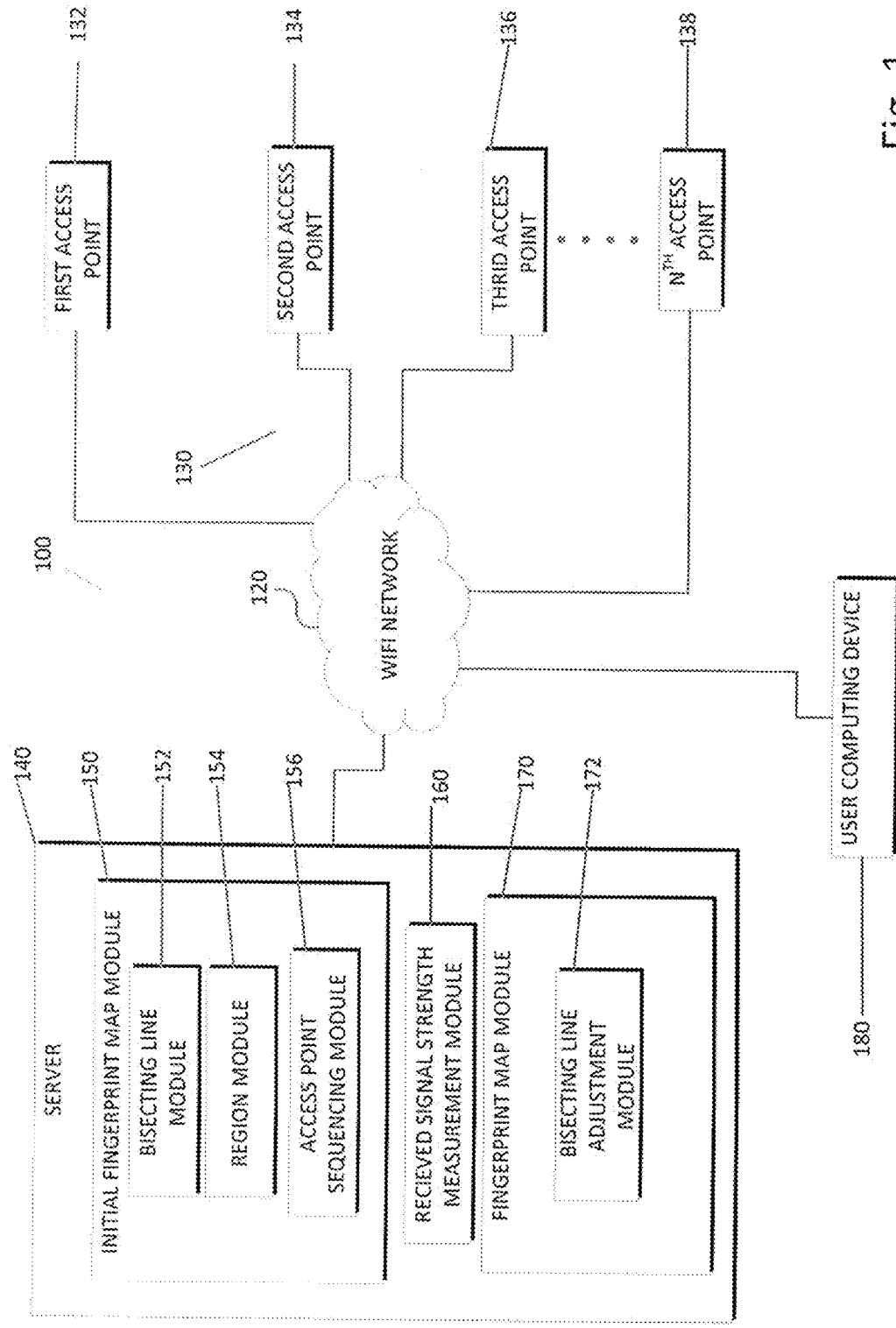
FIG. 1 is a functional block diagram of a WiFi-fingerprint based indoor localization system, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout.

WiFi-fingerprint localization is recognized as one of the most promising indoor localization techniques. However, it suffers from inherent challenges such as heavy initial training, fingerprint map maintenance over time, and device heterogeneity. Techniques have been proposed to tackle these problems independently. To provide a unified solution to resolve these challenges, embodiments of the invention disclose a fingerprint metric called "Access Point Sequence" (AP-sequence) and a corresponding dynamic region partitioning mechanism. The AP-sequence uses relative received signal strength (RSS) value differences among various APs in the creation and maintenance of the fingerprint map. AP-sequence provides robustness against environment noises, for example, signal noise generated by other electronic devices or interference generated by physical objects, such as, furniture or walls, and mobile device heterogeneity. Utilizing dynamic region partitioning mechanisms with AP-sequence enables the automatic creation and maintenance of the fingerprint map with few reference points while increasing localization accuracy.

FIG. 1 is a functional block diagram illustrating a WiFi-fingerprint based indoor localization system 100, in accordance with an embodiment of the present invention. The WiFi-fingerprint based indoor localization system 100 includes a WiFi-network 120, a plurality of access points 130 and a server 140.

WiFi-Network 120 can be, for example, a local area network (LAN), a wide area network (WAN) such as the Internet, or a combination of the two, and can include wired, wireless, or fiber optic connections. In general, WiFi-network 120 can be any combination of connections and protocols that will support communications between the plurality of access points 130, the server 140, a user computing device 180 that gains access to the WiFi-network 120 via one of the known plurality of access points 130 or any fixed wireless devices that are connected to the WiFi-network, in accordance with one or more embodiments of the invention. The WiFi-network 120 includes a plurality of access points 130 distributed over an indoor geographical area to allow the user computing device 180 to connect to the WiFi-network 120. The plurality of access points 130 includes at least a first access point 135 and a second access point 134, but can further include a third access point 136 to the $N^{th}$ access point 138.

Alternatively, WiFi-network 120 supports communications between the server 140 and the user computing device 180. The user computing device 180 sees the plurality of access points 130, i.e. the user computing device 180 receives a signal from the plurality of access points 130. The plurality of access points 130 can be part of WiFi-network 120, but also can be part of different network, so long as the user computing device 180 is able to receive a signal and determine RSS from the plurality of access points 130.

User computing device 180 may be a laptop computer, tablet computer, netbook computer, personal computer (PC), a desktop computer, a personal digital assistant (PDA), a smart phone, or any programmable electronic device capable of communicating with any one of the plurality of access points 130 to gain access to WiFi-network 120, in accordance to one embodiment. User computing device 180 may include internal and external hardware components, as depicted and described in further detail with respect to FIG. 7.

Server 140 generates a WiFi-fingerprint localization map that is used when determining a location for a user computing device 180 that is accessing the WiFi-network 120 by connecting to one of the plurality of access points 130. Server 140 includes an initial fingerprint map module 150, a received signal strength (RSS) measurement module 160 and a fingerprint map module 170. Server 140 may include internal and external hardware components, as depicted and described in further detail below with reference to FIG. 7.

The initial fingerprint map module 150 creates a Euclidean localization map based on the location of the plurality of access points 130 for the WiFi-network 120.

The initial fingerprint map module 150 creates a localization map that can be used to localize a position of a device connected to one of the plurality of access points 130. The initial fingerprint map module 150 will create a Euclidean localization map as an example of the type of localization map. The localization map can further be, for example, a three dimensional map, a spherical map or any type of map that allows for mapping the area of interest. The initial fingerprint map module 150 performs analytical geometry functions on the coordinates of the user computing device 180 and the plurality of access points 130. For simplicity and to allow for visual representation, the initial fingerprint map module 150, received signal strength measurement module 160 and the fingerprint module 170 will be discussed in reference to the Euclidean maps shown in FIGS. 3A-3F and 5-6E. The initial fingerprint map module 150 creates the Euclidean localization map by creating a Euclidean map for the indoor area of interest and marks the location of each of the plurality of access points 130 on the map. For example, this is illustrated by FIGS. 3A-3F, which illustrates the creation of a Euclidean localization map. The initial fingerprint map module 150 includes bisecting line module 152, region module 154 and access point (AP) sequencing module 156.

The bisecting line module 152 has received a predetermined location of each of the plurality of access points 130 for an indoor geographical area of interest and selects two access points, for example, the first access point 135 and the second access point 134 as a starting point. As illustrated in FIG. 3A, the bisecting line module 152 drafts a bisecting line at an initial predetermined angle between the first access point 135 and the second access point 134 on the Euclidean localization map. The bisecting line module 152 takes two access points at a time and drafts a bisecting line between each pair of the access points, until there is a bisecting line between each of the access points. FIGS. 3A-3C illustrate the drafting of the bisecting lines for the area of interest on the Euclidean localization map between the first, second and third access points 135, 134 and 136.

The region module 154 assigns a region identifier to each of the regions in the Euclidean localization map created by the bisecting lines. This is illustrated by FIG. 3D, showing the different regions R1-R6 created by the bisecting lines in the Euclidean localization map.

The access point (AP) sequencing module 156 assigns an AP sequence to each of the identified regions on the Euclidean localization map. The AP sequences assigned by the AP sequencing module 156 are based on the ideal arrangement of no interference between the APs and the user computing device 180. The AP sequence is based on a ranking of which AP that should provide the signal for the identified region. Ideally, the received signal strength (RSS) values of an AP change based on the distance between a reference location and the AP. To reflect the order of RSS values from different APs in each region, the AP sequencing module 156 defines an AP sequence in each region by an AP string. As illustrated by FIGS. 3E and 3F, each element in the string represents a specific access point, ordered from the strongest to the weakest received signal strength (from left to right). For example, the access point sequence "1, 2, 3" in region R6 of FIGS. 3D and 3E indicates that any location residing in R6 should experience the received signal strength in the order of first access point 135 greater than the second access point 134 greater than the third access point 136.

FIG. 2 is a flowchart depicting operational steps creating an initial WiFi-fingerprint localization map, in accordance with an embodiment of the present invention.

The initial fingerprint module 150 creates an Euclidean localization map and marks the location of each of the APs on the map. The bisecting line module 152 drafts a bisecting line between two of the APs on the Euclidean localization map, see, for example, FIG. 3A (S210). The bisecting line module 152 repeats drafting bisecting lines between a pair of APs until a line has been drafted in the Euclidean localization map between each of the APs, see, for example, FIGS. 3B and 3C (S220). The region module 154 assigns a region identifier to each of the regions created by the bisecting lines, see, for example, FIG. 3D (S230). The AP sequencing module 156 assigns an AP sequence in each region by an AP string wherein each element in the string represents a specific AP, ordered from the strongest to the weakest received signal strength, see for example, FIG. 3E (S240).

Returning to FIG. 1, the initial fingerprint map module 150 creates the Euclidean localization map based on ideal parameters. In this ideal case, if the two APs have identical transmission powers, the measured received signal strength values from these two access points on the bisector of the line connecting these two access points are also identical. This implies that an area with two APs can be cut into two distinct regions by a bisector line and each region has a unique access point sequence. However, this ideal approach may not work well in practice because radio signals are subjected to multipath fading and environment noises. In addition, the transmission powers of different access points may also vary over time, and are dynamically adapted by the network controller to maximize bandwidth and coverage.

The received signal strength (RSS) measurement module 160 receives the RSS values from any device, for example, user computing device 180, which receives a signal from any one of the plurality of access points 130 of the WiFi-network 120. The user computing device 180 determines the RSS value for each device that it receives a signal from. The RSS measurement module 160 receives a reading for the RSS values from a reference point, for example, the user computing device 180, as represented by the triangle in FIGS. 3F and 5A. The received signal strength measurement module 160 determines that the bisecting lines that establish the regions need to be adjusted to reflect the received RSS values. For example, when the RSS values at the reference point 180 for second AP 134 is greater than the RSS at the reference point for first AP 135, wherein the RSS measurement module 160 determines that the bisecting lines need to be moved to reflect the received RSS values. The received RSS values at a reference point 180 allows for the RSS measurement module 160 to determine the location of multiple bisecting lines that might need adjustment, because multiple APs can be scanned at the same reference location. Consequently, a few reference location measurements are able to determine the bisecting lines to reflect the real-time fingerprint localization map with a real time accurate AP sequence. FIG. 5A, illustrates that a reference point 180, for example, the user computing device 180 as represented by the triangle would have the ideal access point sequence of "123," but when the RSS measurement module 160 receives the RSS values at the reference point 180 it is determined that the RSS from the second access point 134 is greater than the received signal strength from the first access point 135. The RSS measurement module 160 compares the ideal access point sequence with the received RSS values sequence. In this situation, the position of the bisecting line needs to be shifted, rotated, or adjusted to reflect the received RSS values, which is illustrated by FIG. 5B.

The fingerprint map module 170 receives the RSS values from the RSS measurement module 160 and adjusts the bisecting lines of the Euclidean localization map to reflect the measurement readings. The fingerprint map module 170 includes a bisecting line adjustment module 172.

The received RSS values from APs at individual reference locations can be treated as a constraint on the bisecting lines that form the boundaries for the identified regions. In the example shown in FIGS. 5A and 5B, this constraint is that the bisecting line has to be located above the user computing device 180 as represented by the triangle. In this way, the problem of identifying the location of the bisecting line can be formulated to find a line in the Euclidean space $B_{i,j}$: $y=ax+b$, which satisfies the received RSS values from the user computing device 180.

The bisecting line adjustment module 172 applies a dual space transformation technique on the area of interests to determine where the bisecting line needs to be shifted. Dual space transformation is mathematical technique in computational geometry that may be used to reduce the search complexity in Euclidean space. Specifically, the dual space transformation transforms the reference locations into lines. As a result, the search for the bisecting line in the Euclidean localization map can be simplified to search for a point in the dual space.

Specifically, the lines and reference locations are transformed as follows in the dual space and vice versa.

| | Euclidean Space | | Dual Space |
|---|---|---|---|
| Equation 1: | $B_{ij} : f_{ij}(x) = ax + b$ | ↔ | $\beta_{ij} : (-a, b)$ |
| Equation 2: | $r_i : (x_i, y_i)$ | ↔ | $\alpha_i : w = x_i \cdot v + y_i$ | wherein $B_{ij}:f_{ij}(x)=ax+b$ represents the bisecting line, $r_i:(x_i, y_i)$ represents the reference point in the Euclidean localization map.

An advantageous property of this dual space transformation is that it preserves the proximity relationship, for example, if a line is below/above a reference location in Euclidean localization map, then its transformed point in the dual space is also below/above the transformed line from that reference location.

The bisecting line adjustment module 172 transforms the Euclidean localization map to determine how the bisecting line needs to be adjusted. FIGS. 6A to 6E, illustrates the dual space transformation from the Euclidean localization map to the dual space to determine how the bisecting line needs to be adjusted by the bisecting line adjustment module 172. FIGS. 6A-6E is only an example of the Euclidean localization map that is transformed into dual space to determine the adjustments for the bisecting line. The bisecting line adjustment module 172 takes the reference point and transforms it into a line in dual space by using equation 2, see, for example, FIG. 6B. The bisecting line adjustment module 172 transforms the ideal bisecting line to a point on dual space by using equation 1, see, for example, FIG. 6C. The bisecting line adjustment module 172 transforms the estimate adjusted bisecting line into a vertical line passing through the bisecting line point, see, for example, FIG. 6D. The bisecting line adjustment module 172 is able to determine where the reference point line in dual space intersects with the bisecting line to determine the necessary parameters to apply to bisecting line, for example, the intersection point for the linear equation for the adjusted bisecting line, see, for example, FIG. 6E. Once the adjustment information is obtained by the dual space transformation, which causes the bisecting line adjustment module 172 to adjust the necessary bisecting lines on the Euclidean localization map.

Figure 4:
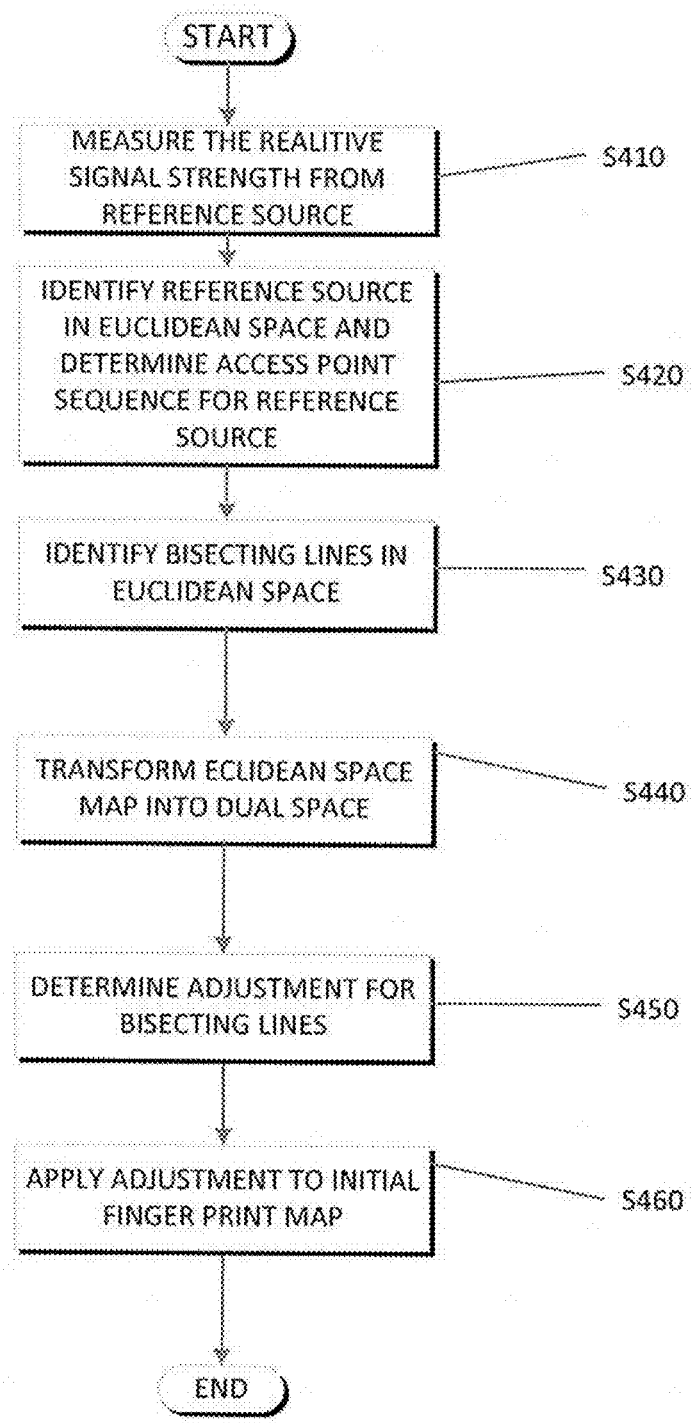
FIG. 4 is a flowchart depicting operational steps adjusting the initial WiFi-fingerprint localization map, in accordance with an embodiment of the present invention.
Figure 6B:
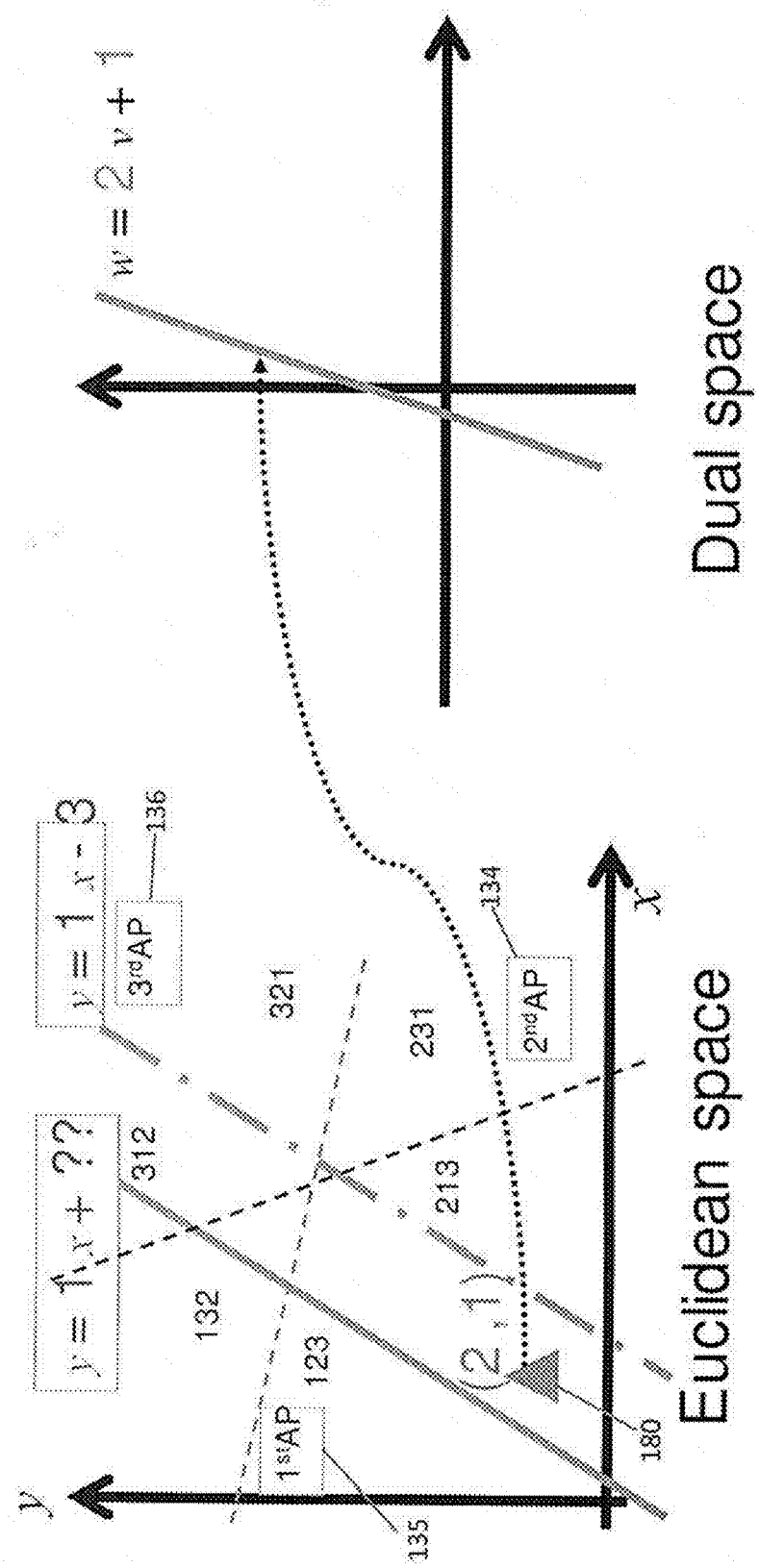
Figure 6C:
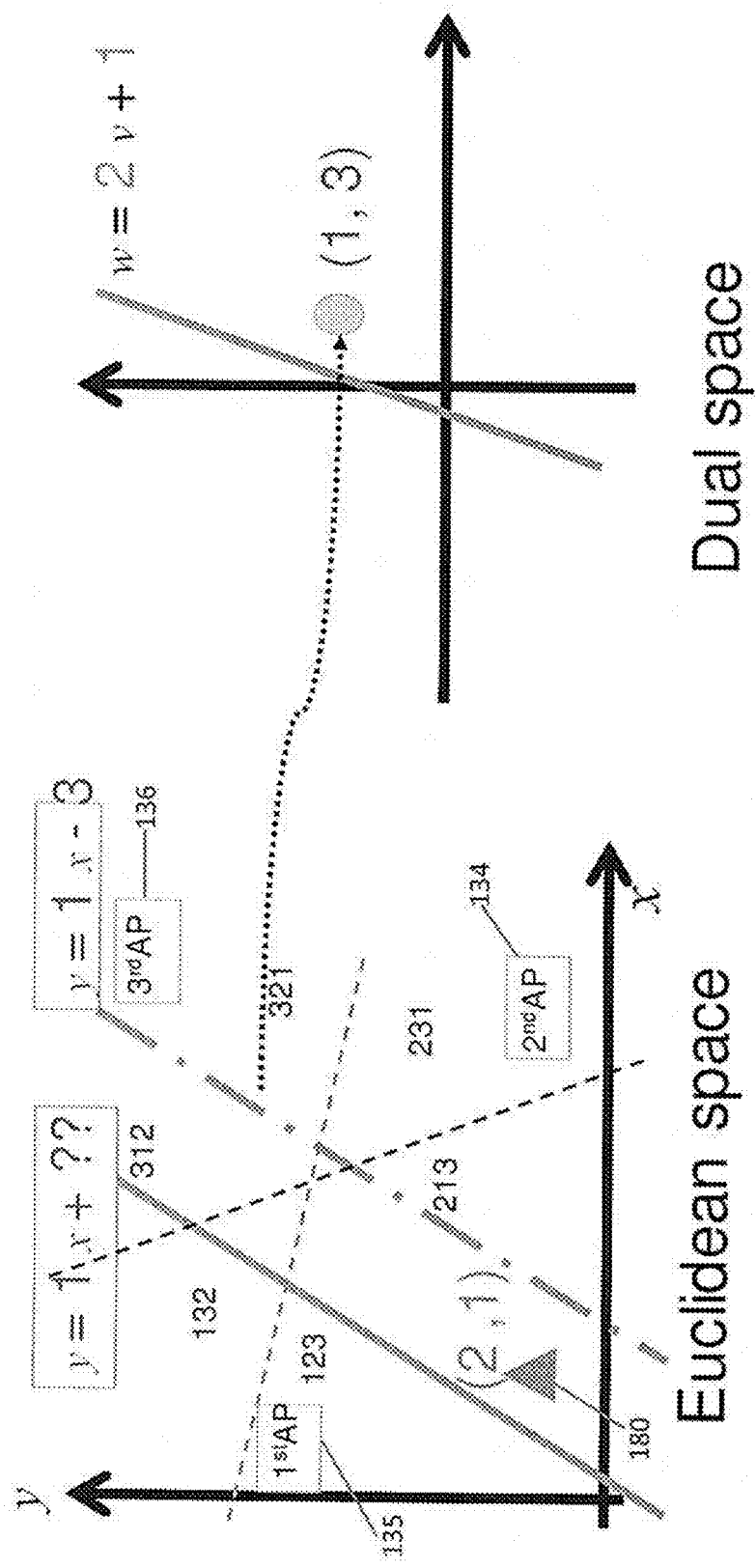
Figure 6D:
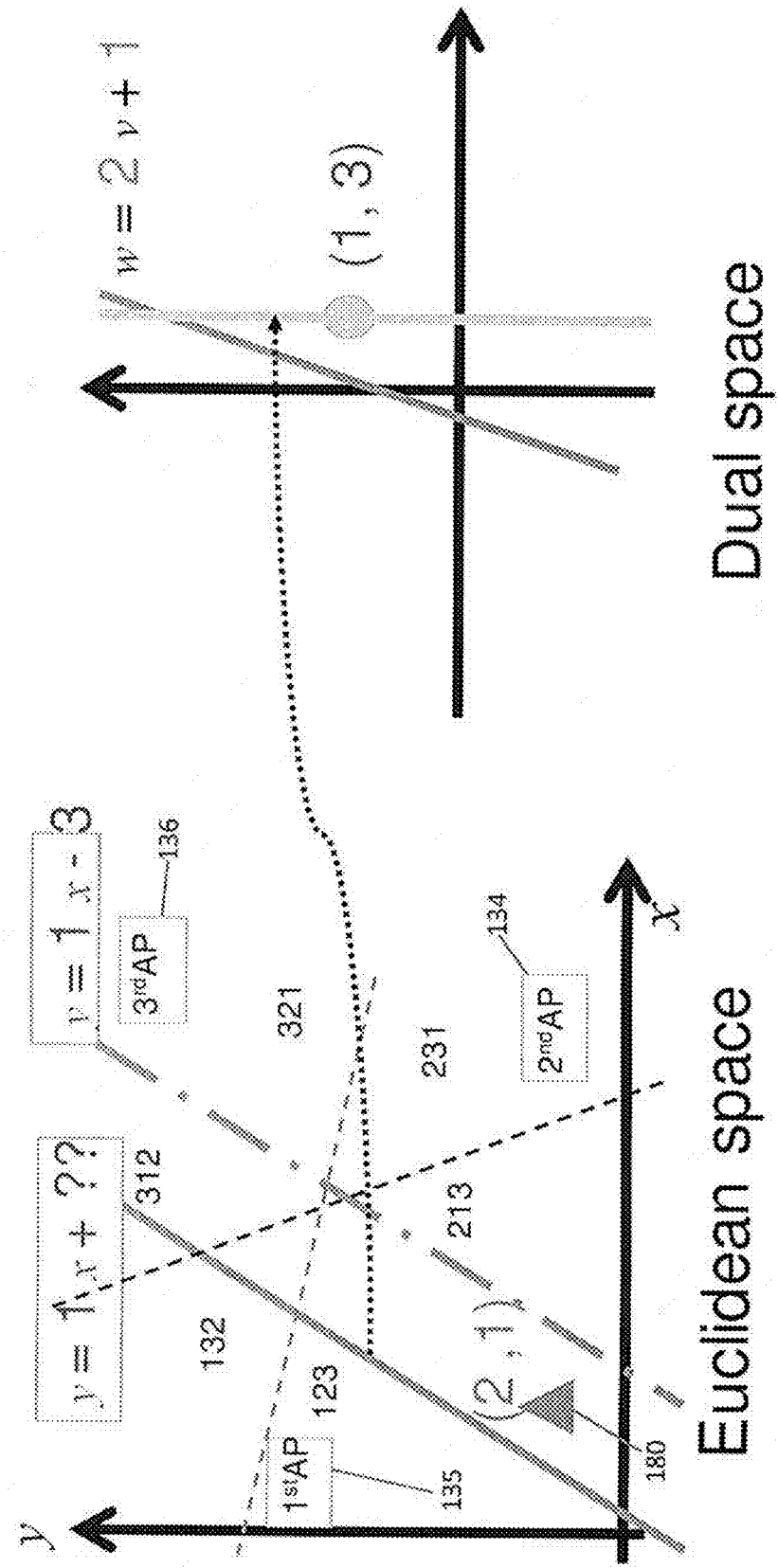
Figure 6E:
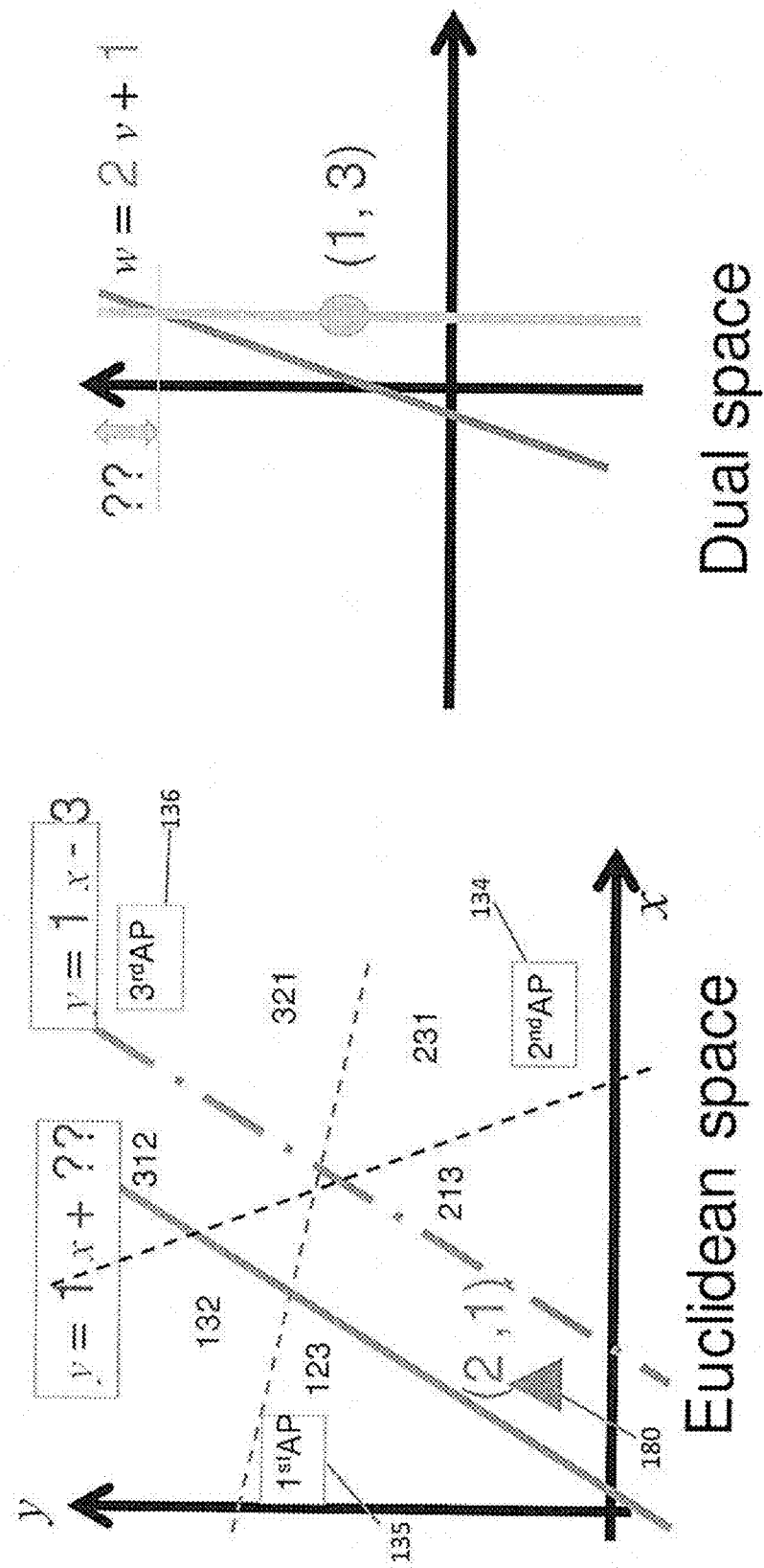

FIG. 4 is a flowchart depicting operational steps adjusting the initial WiFi-fingerprint localization map, in accordance with an embodiment of the present invention.

The RSS measurement module 160 takes a measurement of the RSS at a reference point (S410). The bisecting line adjustment module 172 identifies the location of the reference source on the Euclidean localization map and determines the updated AP sequence for the reference source based on the RSS measurement (S420). The bisecting line adjustment module 172 identifies the bisecting line on the Euclidean localization map that needs to be adjusted based on the updated AP sequence for the reference source location (S430) and transforms the Euclidean localization map data into dual space (S440). The bisecting line adjustment module 172 determines the adjustment that is needed to the bisecting lines based on the dual space transformation (S450) and applying the adjustment to the identified bisecting line in the Euclidean localization map (S460). The bisecting line adjustment module 172 can adjust and/or update the Euclidean localization on a continuous basis or over a predetermined time frame that allows for the location of the user using the WiFi-network 120 to be accurately determined. The server 140 determines a position of a user computing device within the localization map using the RSS values for the signals received by the user computing device. The server 140 the updates of the localization map occurs when detecting the received RSS values at a known location is different from pre-computed sequence or the updating can occur on a predetermined interval.

Figure 7:
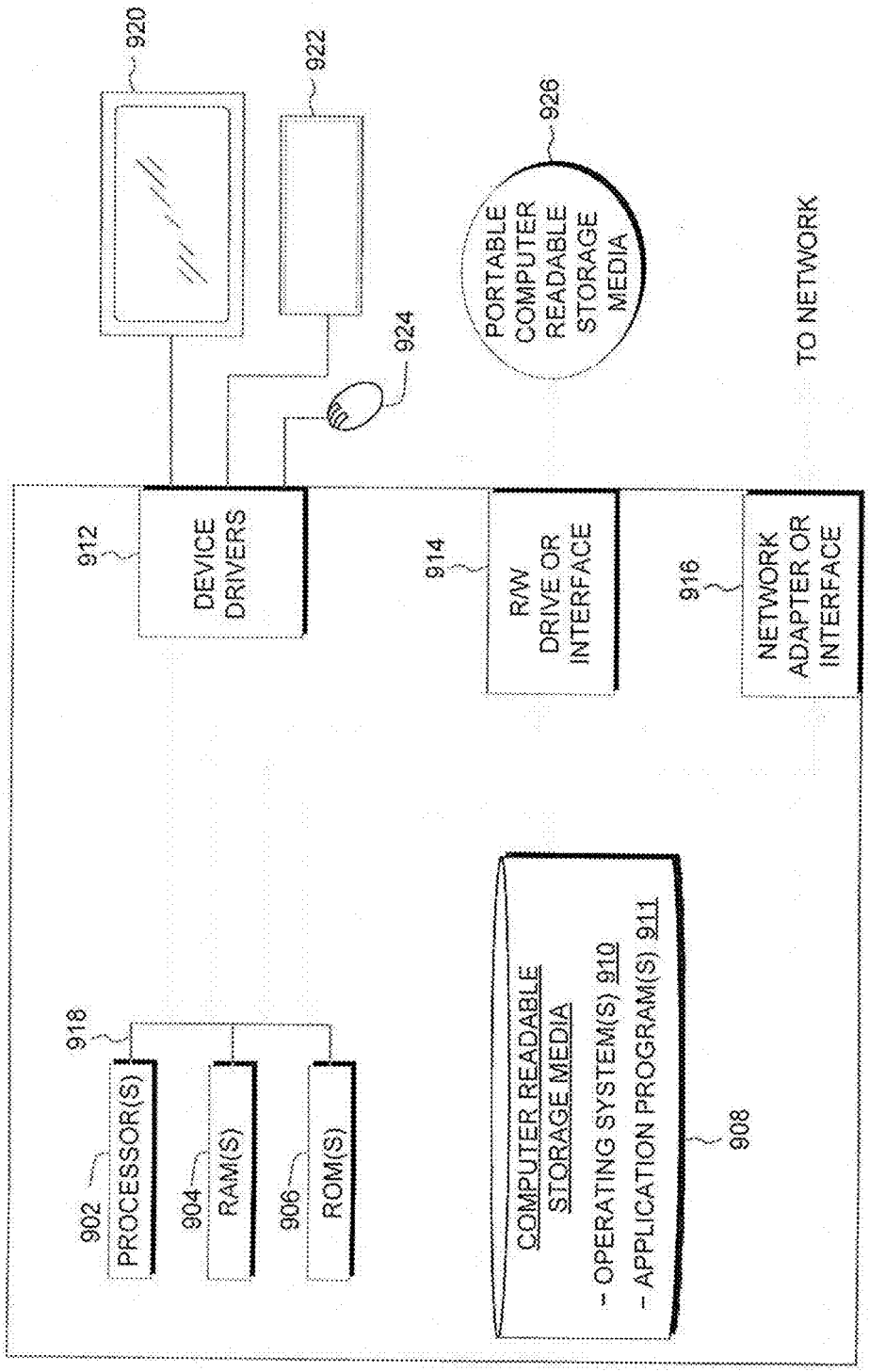
FIG. 7 is a functional block diagram illustrating a data processing environment, in accordance with an embodiment of the present invention.

FIG. 7 depicts a block diagram of components of server 140 of WiFi-fingerprint based indoor localization system 100 of FIG. 1, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

User computing device 180 and/or server 140 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, initial fingerprint map module 150 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User computing device 180 and/or server 140 may also include a R/W drive or interface 914 to read from and write to one or more portable computer readable storage media 926. Application programs 911 on the user computing device 180 and/or server 140 may be stored on one or more of the portable computer readable storage media 926, read via the respective R/W drive or interface 914 and loaded into the respective computer readable storage media 908.

User computing device 180 and/or server 140 may also include a network adapter or interface 916, such as a TCP/IP adapter card or wireless communication adapter (such as a 4G wireless communication adapter using OFDMA technology). Application programs 911 on the user computing device 180 and/or server 140 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

User computing device 180 and/or server 140 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A computer system for making a localization map for a network, the computer system comprising:
one or more non-transitory computer-readable storage media and program instructions stored on the one or more non-transitory computer-readable storage media, the program instructions comprising:
receiving a planer map of an indoor area of interest and a fixed location on a plane for each of a plurality of wireless devices;
creating a of plurality groups, wherein each group of the plurality of groups includes two wireless devices of the plurality of wireless devices, wherein each wireless device forms a plurality of groups such that it forms a group with each of the plurality of wireless devices;

determining a straight connecting line that joins a pair of the plurality of wireless devices that form each group, wherein a straight connecting line is determined for each of the plurality of groups;

determining a bisecting line for each of the straight connecting lines, such that the bisecting line is a line in the plane that bisects the straight connecting line at an initial predetermined angle between the wireless devices that form the group;

assigning a wireless device access sequence to each of a plurality of regions created on the localization map by the bisecting lines, based on a known Euclidean distance of the wireless device to the start of each of the plurality of regions, wherein the wireless device access sequence is the sequence of the wireless devices that is predicted to provide the strongest to weakest signal to the region;

receiving from a user computing device at a known location, a received signal strength (RSS) value for each signal received by the user computing device from each of the plurality of wireless devices;

determining a RSS access sequence for the known location of the user computing device based on the RSS value;

determining that at least two of the bisecting lines on the localization map that need to be updated based on whether the assigned wireless device access sequence for the region corresponding to the known location is different from the determined RSS sequence from the know location of the user computing device;

transforming the localization map into a dual space map to determine an adjustment for the at least two of the plurality of bisecting lines based on the RSS values; and updating the localization map based on RSS values.

* * * * *